(12) United States Patent
Baumgärtner et al.

(10) Patent No.: US 12,292,339 B2
(45) Date of Patent: May 6, 2025

(54) METHOD FOR DETERMINING A THERMAL CONSUMPTION OF AN ENERGY SYSTEM, ENERGY MANAGEMENT SYSTEM AND ENERGY SYSTEM

(71) Applicant: Siemens Aktiengesellschaft, Munich (DE)

(72) Inventors: Thomas Baumgärtner, Erlangen (DE); Martin Kautz, Erlangen (DE); Lisa Wagner, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 663 days.

(21) Appl. No.: 17/432,749

(22) PCT Filed: Feb. 6, 2020

(86) PCT No.: PCT/EP2020/052980
§ 371 (c)(1),
(2) Date: Aug. 20, 2021

(87) PCT Pub. No.: WO2020/169353
PCT Pub. Date: Aug. 27, 2020

(65) Prior Publication Data
US 2022/0146334 A1 May 12, 2022

(30) Foreign Application Priority Data

Feb. 22, 2019 (DE) ...................... 10 2019 202 440.8

(51) Int. Cl.
G01K 13/02 (2021.01)
G01K 3/08 (2006.01)
(Continued)

(52) U.S. Cl.
CPC ............. *G01K 13/026* (2021.01); *G01K 3/08* (2013.01); *G05B 15/02* (2013.01); *G05B 13/02* (2013.01)

(58) Field of Classification Search
CPC ........ G01K 13/026; G01K 3/08; G05B 15/02; G05B 13/02
See application file for complete search history.

(56) References Cited

U.S. PATENT DOCUMENTS 3,150,642 A * 9/1964 Profos ....................... F22D 5/30
976/DIG. 313
8,907,631 B1 * 12/2014 Gurries ................... G01K 13/00
320/141
(Continued)

FOREIGN PATENT DOCUMENTS

CN 204115244 U 1/2015 ............. F24D 19/10
CN 105807633 A 7/2016 ............. G05B 17/02
(Continued)

OTHER PUBLICATIONS

Search Report for International Application No. PCT/EP2020/052980, 11 pages, May 13, 2020.
(Continued)

Primary Examiner — Nathaniel T Woodward
Assistant Examiner — Philip L Cotey
(74) Attorney, Agent, or Firm — Slayden Grubert Beard PLLC

(57) ABSTRACT

Various embodiments include a method for determining the thermal consumption of an energy system having a thermal energy storage unit, wherein the energy system generates a total thermal energy within a time range comprising: determining a thermal charging energy of the thermal energy storage unit within the time range; determining a thermal discharging energy of the thermal energy storage unit within the time range; and calculating a resulting thermal consump-
(Continued)

tion within the time range using a sum of the total thermal energy and the difference between the ascertained thermal discharging energy and the ascertained thermal charging energy.

11 Claims, 2 Drawing Sheets

(51) Int. Cl.
*G05B 15/02* (2006.01)
*G05B 13/02* (2006.01)

(56) References Cited

U.S. PATENT DOCUMENTS

| | | | | |
|---|---|---|---|---|
| 10,746,425 | B1* | 8/2020 | Frader-Thompson | G05B 17/02 |
| 11,585,549 | B1* | 2/2023 | Frader-Thompson | G05B 15/02 |
| 11,803,174 | B2* | 10/2023 | Elbsat | G05B 15/02 |
| 2004/0083029 | A1* | 4/2004 | Bicknell | G05D 23/1931 700/276 |
| 2013/0144451 | A1* | 6/2013 | Kumar | G05B 15/02 700/291 |
| 2013/0178992 | A1* | 7/2013 | De Graeve | G06F 1/26 700/286 |
| 2013/0289788 | A1* | 10/2013 | Gupta | H02J 3/14 700/291 |
| 2014/0266755 | A1* | 9/2014 | Arensmeier | F24F 11/49 340/679 |
| 2015/0066404 | A1* | 3/2015 | Scelzi | G06Q 50/06 702/60 |
| 2015/0127179 | A1* | 5/2015 | Binding | G05B 13/026 700/291 |
| 2015/0316907 | A1* | 11/2015 | Elbsat | G05B 15/02 |
| 2015/0316946 | A1* | 11/2015 | Wenzel | G05B 15/02 |
| 2016/0301344 | A1* | 10/2016 | Pepe | G05D 23/1923 |
| 2017/0016644 | A1* | 1/2017 | Nagarathinam | G05B 13/04 |
| 2017/0031962 | A1* | 2/2017 | Turney | G05D 23/1905 |
| 2017/0198932 | A1* | 7/2017 | Sato | F24F 11/48 |
| 2017/0212488 | A1* | 7/2017 | Kummer | G05B 19/042 |
| 2018/0238572 | A1* | 8/2018 | Murugesan | F24F 11/30 |
| 2018/0348711 | A1* | 12/2018 | Gupta | G05B 13/02 |
| 2018/0356105 | A1 | 12/2018 | Gu et al. | |
| 2019/0003741 | A1* | 1/2019 | van Houten | F24H 15/296 |
| 2019/0032943 | A1* | 1/2019 | Willmott | F24F 11/30 |
| 2019/0033800 | A1 | 1/2019 | Elbsat et al. | |
| 2019/0369581 | A1 | 12/2019 | Gu et al. | |
| 2024/0061404 | A1* | 2/2024 | Wenzel | G05B 13/048 |

FOREIGN PATENT DOCUMENTS

| | | | | |
|---|---|---|---|---|
| CN | 106447529 | A | 2/2017 | G06F 17/50 |
| CN | 108240679 | A | 7/2018 | F24D 19/10 |
| CN | 108258679 | A | 7/2018 | G06Q 10/04 |
| CN | 108280302 | A | 7/2018 | G06F 17/50 |
| CN | 108800186 | A | 11/2018 | F23J 15/02 |
| DE | 3447077 | A1 | 7/1986 | G01K 17/08 |
| DE | 102009049575 | A1 | 4/2011 | F24D 19/10 |
| DE | 102009055670 | A1 | 5/2011 | G01K 17/06 |
| DE | 102010055400 | A1 | 6/2012 | F24D 19/10 |
| DE | 102016015503 | A1 | 6/2018 | F24D 11/00 |
| DE | 10 2017 112505 | | 12/2018 | F24D 19/10 |
| DE | 102017112505 | A1 * | 12/2018 | F24D 19/1048 |
| EP | 2405247 | A1 | 1/2012 | G01K 17/08 |
| EP | 2581673 | A2 | 4/2013 | F24D 19/10 |
| EP | 3223206 | A1 | 9/2017 | F24D 11/00 |
| FR | 1269363 | A | 8/1961 | F01K 3/18 |
| JP | 2016170455 | A | 9/2016 | B09B 3/00 |
| RU | 2663876 | C2 | 10/2014 | H02J 3/14 |
| WO | 2018/130231 | A1 | 7/2018 | G06Q 10/04 |

OTHER PUBLICATIONS

Russian Office Action, Application No. 2021124675/28, 7 pages, May 18, 2022.
Chinese Office Action, Application No. 202080015792.3, 7 pages, Jan. 30, 2024.
European Notice of Opposition, Application No. 20706392.6, 30 pages.

* cited by examiner

METHOD FOR DETERMINING A THERMAL CONSUMPTION OF AN ENERGY SYSTEM, ENERGY MANAGEMENT SYSTEM AND ENERGY SYSTEM

CROSS-REFERENCE TO RELATED APPLICATIONS

This application is a U.S. National Stage Application of International Application No. PCT/EP2020/052980 filed Feb. 6, 2020, which designates the United States of America, and claims priority to DE Application No. 10 2019 202 440.8 filed Feb. 22, 2019, the contents of which are hereby incorporated by reference in their entirety.

TECHNICAL FIELD

The present disclosure relates to energy systems. Various embodiments of the teachings herein include methods for determining the thermal consumption of an energy system having a thermal energy storage unit, wherein the energy system generates a total thermal energy at least within a time range and/or energy management systems for predicting the thermal consumption of the energy system.

BACKGROUND

Energy systems, in particular multimode energy systems, having an energy management system will be of increasingly great importance in the future. The energy management system is in particular part of general automation systems for large buildings or island networks (microgrids). An automation system is provided for controlling/regulating the components of the energy system, for example batteries, heat pumps, thermal energy storage units. Such an automation system basically comprises a plurality of levels, in particular a management level, an automation level and a field level. The automation system may furthermore comprise an energy management system. The energy management system is in this case essentially provided for the energy-efficient control/regulation of the components of the energy system, for the protection of the components and the provision of a certain level of comfort, for example the indoor temperature of rooms.

Typical energy management systems are able to optimize the purchase of all externally procured forms of energy, for example gas, electricity, district heat or district cold. A load profile of the associated form of energy is required for this purpose. For electrical consumption, this may be a historical or measured load profile or a calculated load profile based on assumptions. In this case, the sum of all of the consumers in terms of electrical energy is measured, and the electrical consumption is estimated.

The thermal consumption of the energy system or of a consumer within the energy system is not able to be determined without direct measurement. However, it is typically not possible to measure thermal consumption directly, since this is difficult or even impossible for structural reasons and/or due to tenant rights. Thus, in contrast to electrical consumption, it is not possible to provide a realistic thermal load profile, and it is thus not possible to determine a realistic thermal consumption forecast (prediction of the thermal load) using the energy management system. This is particularly applicable when the energy system comprises a thermal energy storage unit.

SUMMARY

The teachings of the present disclosure may be useful for improving the determination of the thermal consumption of an energy system, in particular with regard to predictions made by an energy management system of the energy system. For example, some embodiments include a method for determining the thermal consumption (50, 51) of an energy system (10) having a thermal energy storage unit (4), wherein the energy system (10) generates a total thermal energy (1) at least within a time range, comprising the following steps: ascertaining (42) a thermal charging energy of the thermal energy storage unit (4) within the time range; ascertaining (42) a thermal discharging energy of the thermal energy storage unit (4) within the time range; and calculating the thermal consumption (50, 51) within the time range by way of at least one sum of the total thermal energy and the difference between the ascertained thermal discharging energy and the ascertained thermal charging energy.

In some embodiments, the energy system (10) is operated based on the determined thermal consumption (50, 51).

In some embodiments, the thermal consumption (50, 51) is determined by way of an energy management system (2), and in which the energy system (10) is operated by the energy management system (2).

In some embodiments, the calculated thermal consumption (50, 51) is used as a thermal load profile for a thermal load prediction of the energy management system (2).

In some embodiments, the calculated thermal consumption (50, 51) is temporally smoothed before it is used as a thermal load profile.

In some embodiments, the thermal energy storage unit (4) is formed at least partially by a thermal network of the energy system (10).

In some embodiments, the discharging energy and/or charging energy of the thermal network is ascertained by taking into consideration the volume and/or temperature of an outward flow and a return flow of the thermal network.

In some embodiments, the thermal charging energy of the thermal network and/or the thermal discharging energy is ascertained by ascertaining a temperature difference between two different times.

As another example, some embodiments include an energy management system (2) for operating an energy system (10) and/or for predicting the thermal consumption (50, 51) of the energy system, wherein the energy system (10) comprises at least one thermal energy storage unit (4) and at least one total thermal energy (1) is able to be generated at least within a time range by way of the energy system (10), comprising: means for ascertaining (42) a thermal charging energy of the thermal energy storage unit (4) within the time range; means for ascertaining (42) a thermal discharging energy of the thermal energy storage unit (4) within the time range; and means for calculating the thermal consumption (50) within the time range by way of a sum of the total thermal energy and the difference between the ascertained thermal discharging energy and the ascertained thermal charging energy.

In some embodiments, the thermal energy storage unit (4) is formed at least partially as a thermal network.

In some embodiments, the thermal network has an outward flow and a return flow, wherein the thermal charging energy and thermal discharging energy is able to be ascertained through at least one measurement of a temperature of the outward flow and/or the return flow.

BRIEF DESCRIPTION OF THE DRAWINGS

Other advantages, features, and details of the teachings herein will emerge from the exemplary embodiments described below and with reference to the drawings, in which, schematically.

Identical, equivalent or functionally identical elements may be provided with the same reference signs in one of the figures or throughout the figures.

DETAILED DESCRIPTION

Figure 1:
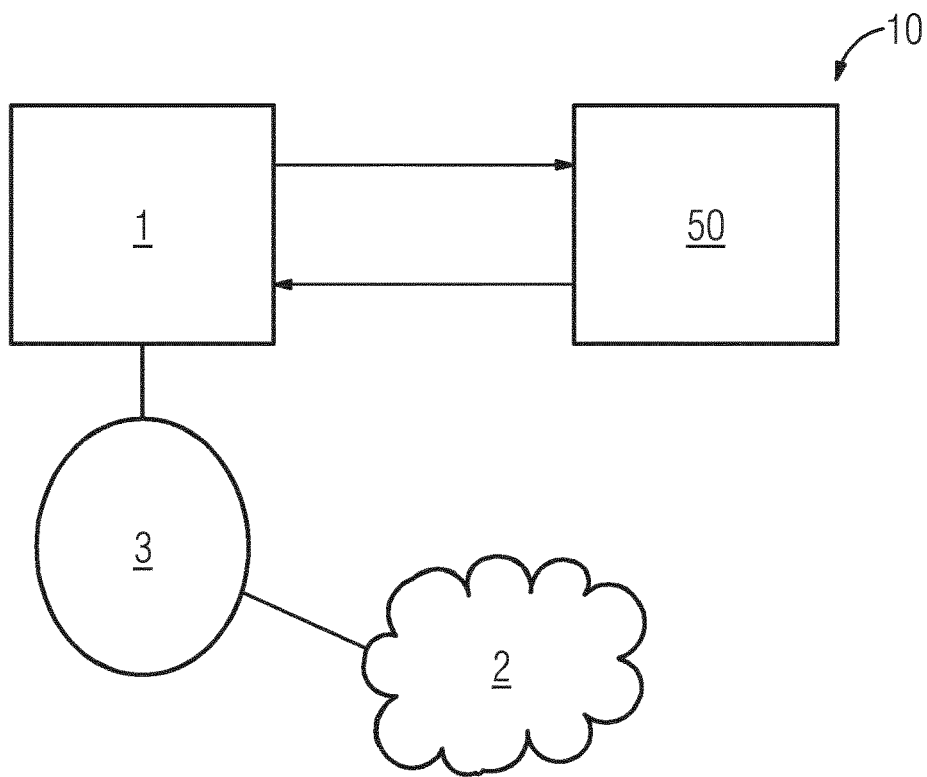
FIG. 1 shows an energy system according to the prior art.

Some example embodiments incorporating teachings of the present disclosure include a method for determining the thermal consumption of an energy system having a thermal energy storage unit, wherein the energy system generates a total thermal energy at least within a time range, comprises at least the following steps:

ascertaining a thermal charging energy of the thermal energy storage unit within the time range;

ascertaining a thermal discharging energy of the thermal energy storage unit within the time range; and calculating the thermal consumption within the time range by way of at least one sum of the total thermal energy and the difference between the ascertained thermal discharging energy and the ascertained thermal charging energy.

The thermal consumption may be heat consumption and/or cold consumption. In the context of the present disclosure, a thermal energy storage unit is any device that allows the storage and/or buffer-storage of thermal energy, in particular heat and/or cold.

In some embodiments, the thermal consumption is determined by measuring the charging energies and discharging energies at the thermal energy storage unit (or heat storage unit) and using these as substitute values in accordance with the approximation $E_{Thermisch}=E_{Gesamt}+E_{Entladen}-E_{Laden}$. In this case, $E_{Gesamt}$ denotes the total thermal energy generated within the time range, $E_{Entladen}$ denotes the discharging energy of the thermal energy storage unit within the time range, $E_{Laden}$ denotes the charging energy of the thermal energy storage unit within the time range and $E_{Thermisch}$ denotes the thermal consumption of the energy system within the time range. For a fixed time range within which the associated powers may be considered to be approximately constant, the above equation may also be formulated by way of the associated powers $P_{Thermisch}=P_{Gesamt}+P_{Entladen}-P_{Laden}$. This is equivalent to the present invention. One advantage of the present invention is that the thermal consumption is approximated realistically without any direct measurement. An improved thermal load profile or heat intake profile or heat consumption profile is then provided for an energy management system.

In some embodiments, an energy management system may be integrated into an existing energy system with little effort. In this case, a thermal network is a device that thermally couples at least one thermal consumer to at least one thermal generator, for example by way of a heat transfer medium. The embodiments described herein may be useful for energy systems that comprise buildings or multimode island networks.

In some embodiments, the energy management system for operating an energy system and/or for predicting the thermal consumption of the energy system, wherein the energy system has at least one thermal energy storage unit and at least one total thermal energy is able to be generated at least within a time range by way of the energy system, comprises at least means for ascertaining a thermal charging energy of the thermal energy storage unit within the time range;

means for ascertaining a thermal discharging energy of the thermal energy storage unit within the time range; and means for calculating the thermal consumption within the time range by way of a sum of the total thermal energy and the difference between the ascertained thermal discharging energy and the ascertained thermal charging energy.

In some embodiments, the energy system comprises an energy management system as described herein. Similar and equivalent advantages of the energy management system incorporating teachings of the present disclosure and the energy systems result from the methods incorporating teachings of the present disclosure.

In some embodiments, the energy system is operated based on the determined thermal consumption. This may improve the energy efficiency of the energy system, in particular with regard to thermal generation and consumption. thermal consumption is determined by way of an energy management system, wherein the energy system is operated by the energy management system. In other words, the energy system comprises the energy management system, which is designed to operate the energy system based on the determined consumption. To this end, the energy system may be designed to determine or calculate the thermal consumption according to the present invention and/or one of its embodiments.

In some embodiments, the calculated thermal consumption is used as a thermal load profile for a thermal load prediction of the energy management system. This allows a realistic prediction of the thermal load profile. The energy efficiency of the energy system that is operated by way of the energy management system may be thereby further improved. The methods may provide an improved forecast with regard to the thermal consumption. In other words, the prediction quality of the energy management system is improved. This is in particular the case since the thermal load prediction is not based on simulated thermal load profiles, but rather on the ascertained discharging energies and charging energies of the thermal energy storage unit, for example on the energy storage behavior of the thermal energy storage unit as ascertained on pipelines of the thermal energy storage unit.

In one advantageous embodiment of the invention, the determined thermal consumption is temporally smoothed before it is used as a thermal load profile.

This is advantageous since the ascertained discharging energies and charging energies may typically exhibit relatively large fluctuations. This is in particular the case when they are ascertained on an outward flow and return flow of the thermal energy storage unit. The smoothing, for example by way of a sliding average over two hours, provides a smoother and thus improved thermal load profile, which in particular leads to an improved prediction of the thermal consumption.

In some embodiments, the thermal energy storage unit is formed at least partially by a thermal network of the energy system. In other words, the thermal energy storage unit is formed at least partially, in particular completely, as a thermal network of the energy system. The thermal network is thus at least partially considered or understood as a thermal energy storage unit. In this case, the energy system comprises at least part of the thermal network. Large thermal networks of commercial buildings, campuses or multimode island networks typically contain a large volume of their heat transfer medium. As a result, they cannot be ignored with regard to their thermal storage properties. It is therefore advantageous to consider the thermal network as a thermal energy storage unit. The present invention therefore makes it possible to determine the thermal consumption of the thermal network in the same way as a thermal energy storage unit, for example as described above. As a result, the thermal consumption of a large thermal network is advantageously able to be determined, and the determination of the thermal consumption is able to be improved.

In some embodiments, the discharging energy and/or charging energy of the thermal network is ascertained by taking into consideration the volume and/or temperature of an outward flow and a return flow of the thermal network. In other words, the thermal network has an outward flow and/or a return flow for its heat transfer medium, for example for water. In this case, the discharging energies and/or charging energies of the thermal network are determined on the basis of the volume and/or temperature of its outward flow and/or return flow. This makes it possible to provide an approximation for the thermal consumption. In particular, this allows an improved prediction of the thermal consumption. By way of example, a rough estimate of the amount of water in a heating system (thermal network) and knowledge about the tolerances of the outward flow temperatures and return flow temperatures are sufficient. With knowledge of said variables, it is possible to achieve optimized operation of the energy system, in particular by way of an energy management system, based on the determined thermal consumption. In this case, said temperatures may be measured on the outward flow or return flow. The determined thermal consumption may be taken into consideration as a heat generation profile in a prediction of the energy management system. In other words, fluctuating outward flow temperatures and/or return flow temperatures are recognized as a thermal energy storage unit and may be taken into consideration in the optimization by way of the energy management system.

In some embodiments, the thermal charging energy of the thermal network and/or the thermal discharging energy is ascertained by ascertaining a temperature difference between two different times. In other words, the thermal charging energy or thermal discharging energy is in each case calculated by way of $[T(t_1)-T(t_2)] \cdot c \cdot V \cdot \rho$. In this case, $T(t_1)$ denotes the temperature at the time $t_1$, for example of the outward flow or return flow, $T(t_2)$ denotes the temperature at the time $t_2$, for example of the outward flow or return flow, c denotes the specific thermal capacity of the heat transfer medium of the thermal network, V denotes the volume of the heat transfer medium and $\rho$ denotes the density of the heat transfer medium.

FIG. 1 shows a known energy system 10. In this case, the energy system 10 comprises components 1 (thermal generators) that provide a total thermal energy. The total thermal energy is also identified by the reference sign 1. The energy system 10 furthermore comprises an energy management system 2. The energy management system 2 is able to ascertain the total thermal energy 1 by way of a direct measurement 3.

The energy system 10 furthermore comprises components 50 (thermal consumers) that consume at least some of the total thermal energy generated. This thermal consumption is also identified by the reference sign 50.

The thermal generators 1 are typically thermally coupled to the thermal consumers 50 by way of a thermal network. This thermal coupling is symbolized by the arrows between the thermal generators 1 and thermal consumers 50. The direction of these arrows indicates an outward flow and return flow of the thermal network for a heat transfer medium, for example water, of the thermal network. According to the prior art, the thermal network is not part of the measurement of the energy system 2. In other words, the energy system 2 ascertains only the total thermal energy through the direct measurement 3.

Figure 2:
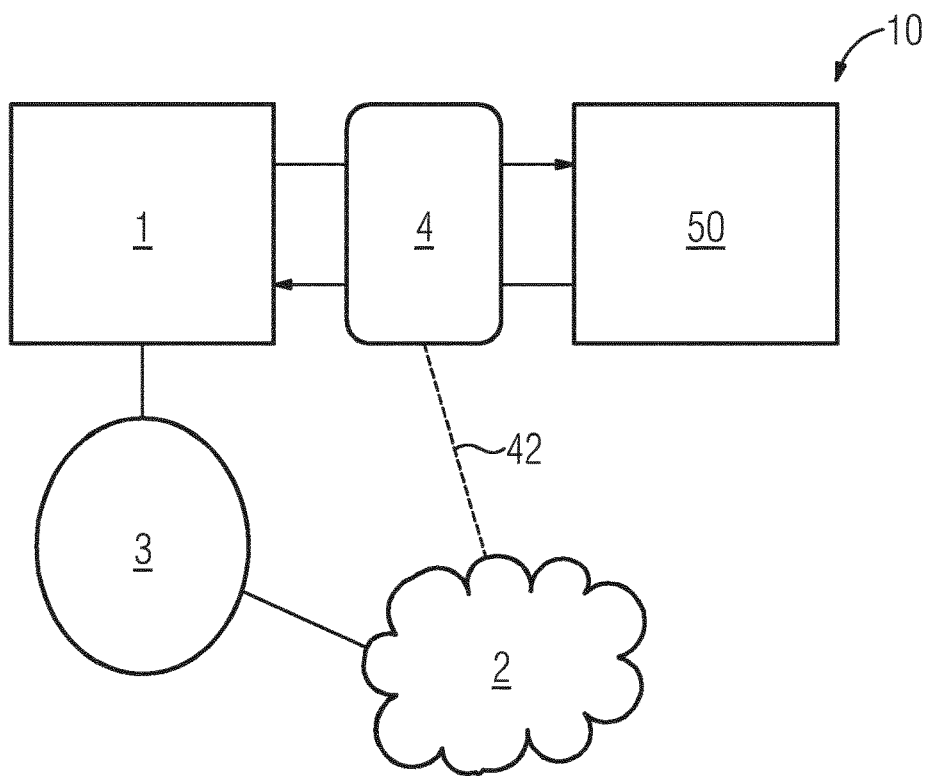
FIG. 2 shows an energy system according to one embodiment of the teachings of the present disclosure.

FIG. 2 illustrates an energy system 10 in which the thermal network between the thermal generators 1 and the thermal consumers is considered as a thermal energy storage unit 4. In other words, the thermal network between the thermal generators 1 and the thermal consumers 50 forms the thermal energy storage unit 4. A direct measurement 3 of the total thermal generation may furthermore be performed by an energy management system 2 of the energy system 10.

In some embodiments, the thermal consumption is not ascertained solely through the direct measurement 3, but rather by ascertaining (measuring) the thermal charging energies and discharging energies of the thermal energy storage unit 4, that is to say of the thermal network. As a result, the storage properties of the thermal network may advantageously be taken into consideration in the determination of the thermal consumption by the energy management system 2. The thermal consumption is then determined by the sum of the total thermal generation of the generators 1 and the difference between the ascertained thermal discharging energy and the ascertained thermal charging energy. In this case, the thermal network is considered as a thermal energy storage unit 4. The charging energies or discharging energies may each be ascertained on the outward flow or return flow of the thermal network or of the thermal energy storage unit 4.

Figure 3:
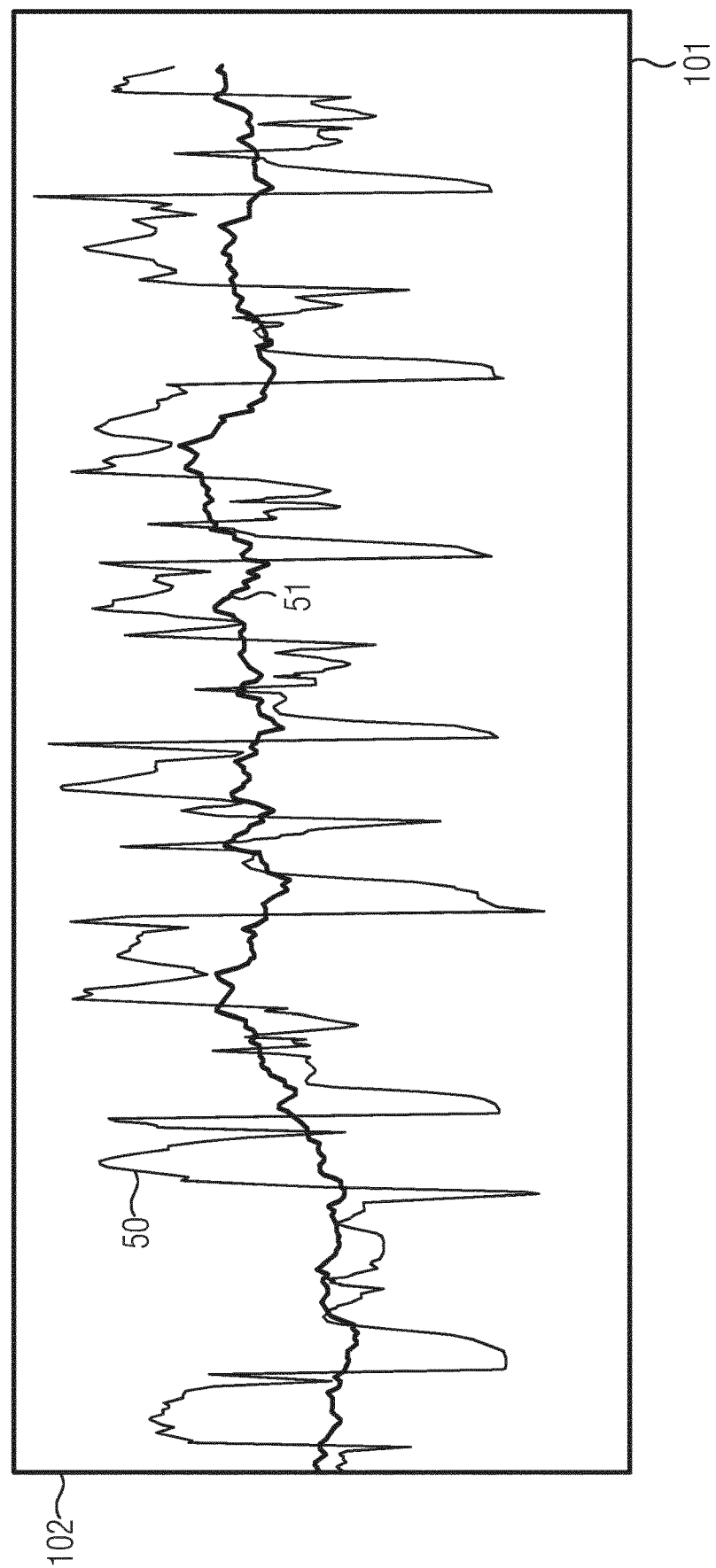
FIG. 3 shows the thermal consumption determined by way of one embodiment of the teachings of the present disclosure.

FIG. 3 shows the thermal consumption ascertained and smoothed on the thermal energy storage unit 4 or thermal network in accordance with FIG. 2. In this case, time is plotted in arbitrary units on the abscissa 101 of the illustrated graph. Thermal consumption (in the form of thermal power) is plotted in arbitrary units, for example in kilowatts, on the ordinate 102 of the illustrated graph.

A curve 50 corresponds to the ascertained time-dependent thermal consumption. The thermal consumption 50 exhibits irregular behavior with large variations or fluctuations (spikes). This is therefore not particularly advantageous for a prediction of the thermal consumption by way of the energy management system 2, for example in the form of a heat generation profile. An improved profile or an improved course of the thermal consumption 50 may be achieved by way of smoothing. In this case, the thermal consumption 50 is temporally smoothed. This gives the curve 51. In other words, the curve 51 shows the smoothed thermal consumption 50. In some embodiments, the curve 51 may be used as a heat generation profile for the energy management system 2, for example in order to predict the thermal consumption. This improves the prediction of the thermal consumption by way of the energy management system. It is crucial for this that the thermal network is interpreted and recognized as a thermal energy storage unit 4.

Although the teachings herein have been described and illustrated in more detail by way of the exemplary embodiments, the scope of the disclosure is not restricted by the disclosed examples or other variations may be derived therefrom by a person skilled in the art without departing from the scope thereof.

LIST OF REFERENCE SIGNS 1 generation of total thermal energy
2 energy management system
3 measurement
4 thermal energy storage unit
10 energy system
42 ascertainment of thermal charging and discharging energy
50 thermal consumption
51 smoothed thermal consumption
101 abscissa
102 ordinate

What is claimed is:

1. A method for determining the thermal consumption of an energy system, wherein the energy system generates a total thermal energy within a time range, the method comprising:
    determining a thermal charging energy of the energy unit within the time range;
    determining a thermal discharging energy of the energy system within the time range; and
    calculating a resulting thermal consumption within the time range by adding the total thermal energy to a difference between the ascertained thermal discharging energy and the ascertained thermal charging energy;
    wherein the energy system includes a heat transfer medium within a thermal network, the heat transfer medium transported between a multiplicity of heat exchange elements and at least one thermal energy storage unit; and
    determining the thermal charging energy of the energy system and the thermal discharging energy of the energy system includes consideration of a volume flow rate and a temperature of the heat transfer medium within the energy system.

2. The method as claimed in claim 1, further comprising operating the energy system based on the calculated thermal consumption.

3. The method as claimed in claim 2, wherein:
    the thermal consumption is determined by an energy management system; and
    the energy system is operated by the energy management system.

4. The method as claimed in claim 3, wherein the calculated thermal consumption is used as a thermal load profile for a thermal load prediction of the energy management system.

5. The method as claimed in claim 4, further comprising smoothing the calculated thermal consumption before using the consumption as a thermal load profile.

6. The method as claimed in claim 1, wherein the energy system comprises a thermal network of the energy system.

7. The method as claimed in claim 6, wherein determining the discharging energy and/or charging energy of the thermal network includes taking into consideration the volume and/or temperature of an outward flow and a return flow of the thermal network.

8. The method as claimed in claim 6, wherein determining the thermal charging energy of the thermal network and/or the thermal discharging energy includes ascertaining a temperature difference between two different times.

9. An energy management system for operating an energy system and/or for predicting the thermal consumption of the energy system, wherein a total thermal energy is generated within a time range, the energy management system comprising:
    means for determining a thermal charging energy of the thermal energy storage unit within the time range;
    means for determining a thermal discharging energy of the thermal energy storage unit within the time range; and
    means for calculating the thermal consumption within the time range by adding the total thermal energy to a difference between the ascertained thermal discharging energy and the ascertained thermal charging energy;
    wherein the energy system includes a heat transfer medium within a thermal network, the heat transfer medium transported between a multiplicity of heat exchange elements and at least one thermal energy storage unit; and
    determining the thermal charging energy of the energy system and the thermal discharging energy of the energy system includes consideration of a volume flow rate and a temperature of the heat transfer medium within the energy system.

10. The energy management system as claimed in claim 9, wherein the energy system comprises a thermal network.

11. The energy management system as claimed in claim 10, wherein:
    the thermal network has an outward flow and a return flow;
    the thermal charging energy and thermal discharging energy are ascertained through at least one measurement of a temperature of the outward flow and/or the return flow.

* * * * *